United States Patent
Markley et al.

(10) Patent No.: US 6,575,861 B2
(45) Date of Patent: Jun. 10, 2003

(54) SPROCKET AND CHAIN FOR LIMITING CHORDAL FALL MOTION

(75) Inventors: George L. Markley, Montour Falls, NY (US); Mark MacDonald Wigsten, Lansing, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 09/822,580

(22) Filed: Mar. 30, 2001

(65) Prior Publication Data

US 2002/0142874 A1 Oct. 3, 2002

(51) Int. Cl.⁷ ................................................ F16H 7/06
(52) U.S. Cl. ........................ 474/156; 474/152; 474/213
(58) Field of Search ........................ 474/148, 152–157, 474/161, 212, 213

(56) References Cited

U.S. PATENT DOCUMENTS

| | | | | |
|---|---|---|---|---|
| 566,750 A | * | 9/1896 | Gardner | 474/91 |
| 1,140,319 A | * | 5/1915 | van Houten | 474/139 |
| 1,956,942 A | | 5/1934 | Belcher et al. | 74/245 |
| 2,223,314 A | * | 11/1940 | Cumfer | 474/207 |
| 2,525,561 A | * | 10/1950 | Pierce | 474/213 |
| 3,597,985 A | * | 8/1971 | Jeffrey | 474/148 |
| 3,605,513 A | * | 9/1971 | Sugimoto | 474/148 |
| 5,224,903 A | * | 7/1993 | Langhof et al. | 474/152 |
| 5,437,581 A | * | 8/1995 | Ledvina et al. | 474/85 |
| 5,967,926 A | | 10/1999 | Kozakura et al. | 474/213 |
| 5,989,140 A | * | 11/1999 | Ichikawa et al. | 474/148 |
| 6,267,701 B1 | * | 7/2001 | Mott | 474/164 |

\* cited by examiner

Primary Examiner—William C Joyce
Assistant Examiner—Timothy McAnulty
(74) Attorney, Agent, or Firm—McAndrews, Held & Malloy, Ltd.; Greg Dziegielweski

(57) ABSTRACT

A sprocket for engaging a power transmission chain and for limiting motion of the chain along the radial direction of the sprocket is disclosed. The sprocket supports the chain at the sprocket teeth to limit chain motion in the radial direction of the sprocket at the sprocket teeth. The support limits chain motion in the radial direction including motion induced by chordal fall.

6 Claims, 4 Drawing Sheets

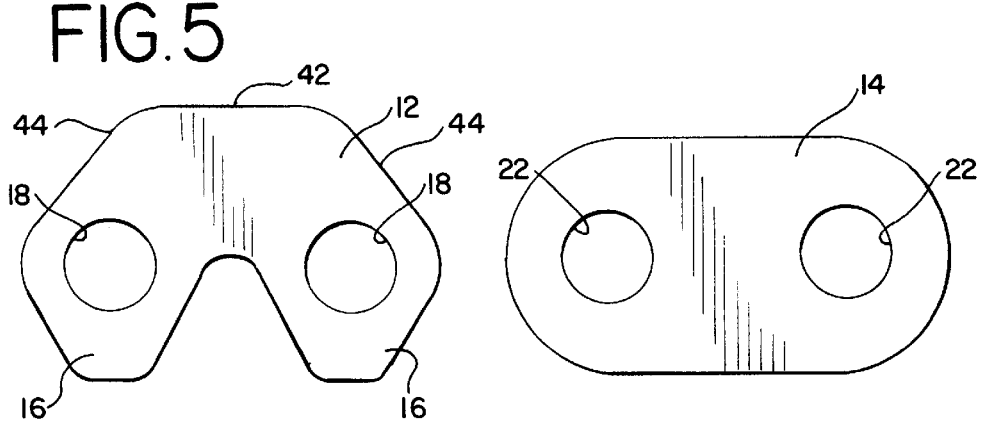
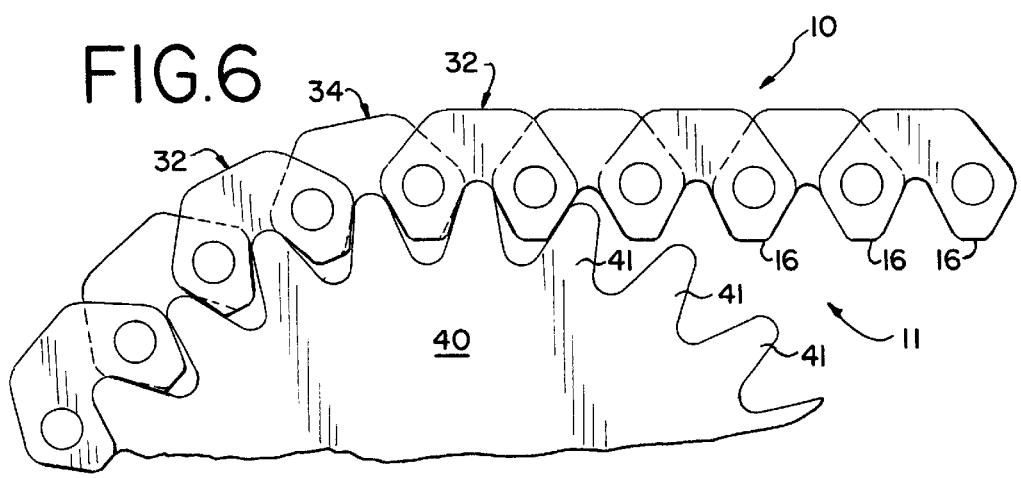
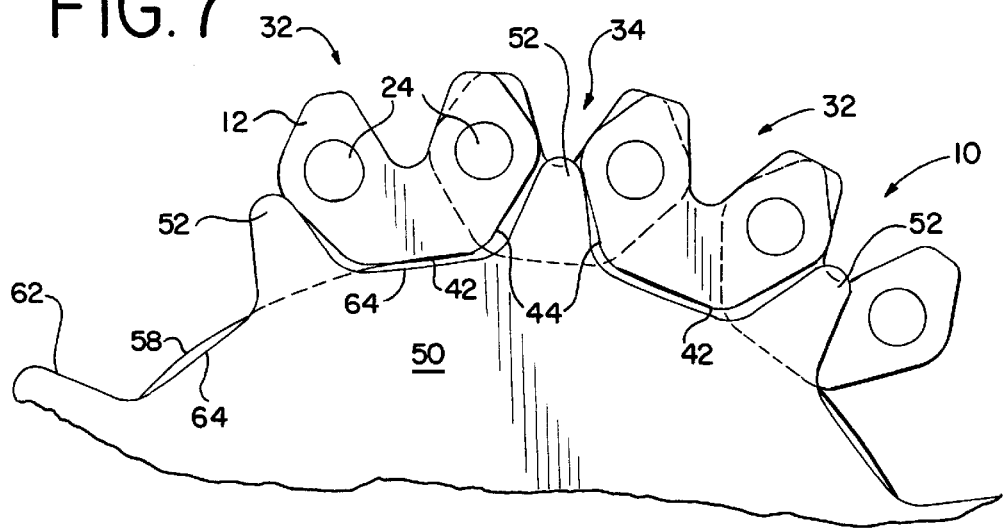

SPROCKET AND CHAIN FOR LIMITING CHORDAL FALL MOTION

CROSS-REFERENCE TO RELATED APPLICATIONS

Not applicable.

STATEMENT REGARDING FEDERALLY SPONSORED RESEARCH OF DEVELOPMENT

Not applicable.

BACKGROUND OF THE INVENTION

A power transmission chain transmits power from a driving sprocket to one or more driven sprockets by forming an endless loop that partially wraps and engages the teeth of sprockets. Rotation of the driving sprocket moves the chain thereby transmitting power through the chain to rotate the driven sprockets engaged by the chain. Power transmission chains are widely used in the automotive industry. In an engine timing application, a chain transmits power from at least one driving sprocket positioned on a crankshaft to at least one driven sprocket positioned on a camshaft. Other automotive applications include, transmitting power from a torque converter to a transmission and transmitting power in the transfer case of a four wheel drive vehicle. Power transmission chains are also widely used in industrial applications.

One type of power transmission chain is known as a "silent chain." A typical silent chain comprises links that are adjacent to each other along the chain. Each link conventionally forms two teeth that are adjacent to each other along a chain direction of the link, that extend in a front direction that is perpendicular to the chain direction, and that are formed to engage the teeth of a sprocket. Links of a silent chain also conventionally form two apertures, one near each end of the link along the chain direction, that extend through the link in a lateral direction that is perpendicular to the chain direction and perpendicular to the front direction of the link. The links of a silent chain are typically formed by a row of substantially identical flat links, each forming teeth and apertures as described, that are positioned laterally adjacent to each other to collectively form a link of the chain.

A silent chain is formed by positioning rows of flat links adjacent to each other and partially overlapping along the chain directions of adjacent chain links so that apertures at adjacent ends of links are aligned. Pivots, such as pins, extend through the aligned apertures to pivotally join adjacent links. Rows of links are joined in this manner to form an endless loop in which the front direction of the links, the direction that the teeth extend from the chain links, is directed toward the region within the endless loop formed by the chain. Links having teeth extending into the region within the loop are referred to as inverted tooth links. The inner surface of the chain, along which the teeth extend, is referred to as the front side of the chain. The surface of the chain opposite the front side facing outwardly from the region within the endless loop is the back side of the chain.

The inverted tooth links (sometimes referred to as driving links) transfer power between the chain and sprocket along the chain direction. Each tooth of a link defines an inside flank that faces generally along the chain direction toward the adjacent tooth of the link, and an outside flank that faces away from the inside flank of the tooth. The inside flanks of the teeth of an inverted tooth link meet at a crotch between the teeth. The teeth of a link may contact sprocket teeth along their inside flanks or along their outside flanks, or along both flanks. The contact between a link tooth flank and a sprocket tooth may transfer power or may be an incidental contact. An inverted tooth link conventionally may contact a sprocket on a side of a sprocket tooth or at a root between adjacent sprocket teeth.

A row of inverted tooth links is positioned on a sprocket by contact with three sprocket teeth, one at each end of the row along the chain direction, and one between the teeth of the links of that row. A row of links is positioned at each location by contact with the sprocket by the teeth of the links comprising the row contacting the sprocket, by the adjacent teeth of the links of the adjacent rows, or by both. Contact with the sprocket at three locations along the chain direction of the row links limits motion of the row of links on the sprocket.

Silent chains often include guide links. Guide links are conventionally flat plates that are positioned on the lateral outside edges of alternate rows of inverted tooth links. The guide links do not form teeth, but generally extend along the row of links and adjacent to the region between teeth formed by the row of links. The guide links on opposite lateral sides of a row are separated by approximately the lateral width of the sprocket teeth that extend between the teeth of the row of links. The guide links thereby act to position the chain laterally on a sprocket (i.e., maintain the chain on the center of the sprocket) but do not engage a sprocket between teeth of the sprocket.

A conventional silent chain drive is comprised of an endless loop silent chain that wraps at least two sprockets. Each sprocket is mounted to a shaft. Rotation of the shaft on which the driving sprocket is mounted transmits power from the driving sprocket through the chain to rotate a driven sprocket and the shaft to which the driven sprocket is mounted. FIG. 1a illustrates such a basic arrangement. A chain 3 forms an endless loop and partially wraps driving sprocket 1 and driven sprocket 2 that are within the loop. A front side 4 of the chain 3 is adjacent to the region within the endless loop formed by the chain 3. Teeth extend inwardly along the front side 4 to engage teeth of both the driving sprocket 1 and the driven sprocket 2. The back side 5 of the chain 3 is the side of the chain opposite the front side 4 and faces outwardly from the chain loop. Both the driving sprocket 1 and the driven sprocket 2 rotate in the same direction, shown counter-clockwise by FIG. 1a.

Silent chains may also drive sprockets that engage the back side of the chain. Examples of devices that are driven by the back side of a silent chain (back-driven) include water pumps, injector pumps, and countershafts. FIG. 1b shows a sprocket 6 that is back-driven by the chain 3. As in FIG. 1a, a driven sprocket 2 engages the teeth on the front side 4 of the chain 3 and rotates in the same direction as the driving sprocket, counter-clockwise in FIG. 1b. Teeth of the back-driven sprocket 6 engage the back side 5 of the chain 3. The back-driven sprocket 6 rotates in the opposite direction of the driven sprocket 2.

Often, the back side of the links of a chain that engages and drives a sprocket is configured to engage a sprocket as a single tooth between two adjacent sprocket teeth. The teeth of sprockets engaged by the back side of such links are spaced apart by the length of the chain link. Consequently, these sprockets engage a chain link in fewer and farther separated locations than do front driven sprockets. This results in a lower capacity for power transmission by back-driven sprockets. The lower power transmission capacity is acceptable because back-driven sprockets are frequently located in the slack region of the chain and/or are not required to transmit forces that are as large as can be transmitted by the front side of the silent chain. The fewer and more separated contact locations do not control motion of the chain on the sprocket as does contact with a front driven sprocket.

Noise can be generated by a variety of sources in silent chain drives. One significant source of noise is the impact of sprocket teeth on chain teeth at the onset of engagement of the sprocket by the chain teeth. Among the factors that affect the level of the noise created by impact are the impact velocity between the chain and the sprocket and the mass of chain links contacting the sprocket. Noise created by engaging impact in silent chain drives is generally periodic with a frequency generally corresponding to the frequency of the chain teeth engaging sprocket teeth. This frequency is related to the number of teeth on the sprocket and the speed of the sprocket. The impacts can produce sound having objectionable pure sonic tones.

Chordal motion of a chain is another source of noise in power transmission chain drives, including silent chain drives, that is associated with engagement of a chain and sprocket. Chordal motion occurs as a chain link initially engages and begins to move with a sprocket. The sprocket can cause a movement of the span of free chain that is approaching the sprocket along the front to back direction of the chain. This vibratory movement, known as chordal fall, can also produce an objectionable pure sonic tone at the frequency of the chain mesh frequency or a multiple of it.

FIG. 2 illustrates chordal fall. Chains are comprised of a series of pivotally joined rigid links. Consequently, chains are not continuously flexible and do not wrap a sprocket as a circular arc. Rather, a chain wraps around a sprocket in a series of line segments, or chords. As a silent chain engages a sprocket, the individual link teeth contact the surfaces of a sprocket tooth and extend between adjacent teeth of the sprocket. This contact forces the links to articulate around pivot joints with respect to adjacent links. The chain thus bends at the pivot joints between adjacent links as it engages and wraps around a sprocket.

FIG. 2 shows a chord C, which joins the pivot points A and B of a chain link at the position at which the point A engages a sprocket from a free chain run along a direction F. The chord C' joins the pivot points at positions A' and B' where the point A has moved with the sprocket half way to the point B location. As shown, by moving from the location A to the location A' the point A has moved a distance R in the direction T that is perpendicular to the direction F along the free span of the chain. The distance R is the chordal fall of the chain.

Because a chain repeatedly engages teeth, as described above, the change in position of the chain between repeated engagement of the chain causes chordal fall. The chordal fall is proportional to the length of C between pivots and inversely proportional to the radius of the circular path traveled by the points A and B around the center of a sprocket. The longer the distance between points at which the chain pivots to engage the sprocket, the chain pitch, the greater chordal fall will be. The smaller the radius of the circular path traveled by the points A and B around the center of a sprocket, the greater the chordal fall will be. For example, a chain with a long pitch engaging a sprocket with relatively small diameter will experience a pronounced amount of chordal fall. In contrast, for an ideal toothless belt engaging a smooth pulley continuously, the length of chord C will be infinitely small, and consequently the belt will experience no chordal fall.

Back-drive chain and sprocket engagement can exacerbate the problem of chordal fall by permitting greater uncontrolled chordal fall movement of a chain on a sprocket than occurs for front drive engagement. A tooth of a front-driven sprocket extends between teeth of a link on the front side of the chain, and two adjacent sprocket teeth engage the link at its ends along the chain direction, one adjacent to each tooth outer flank of the inverted tooth link. A tooth of a back-driven sprocket can only engage the back side of the chain between links along the chain direction. Because the back driven sprocket engages the chain at fewer and more widely separated locations than the front-driven sprocket, the chain frequently moves along the teeth of the back-driven sprocket a greater amount than it does along the teeth of a front-driven sprocket. This movement of the chain along the sprocket teeth in the radial direction of the sprocket is in the approximate direction of chordal fall, and therefore causes the chordal fall motion of the chain to increase due to inability of the chain and sprocket contact to control the chordal fall motion.

One method known in the art to decrease chordal fall motion at back-driven sprockets is to use chains formed by interleaved flat links, that is a flat link is laterally adjacent to ends of two links that are aligned with and adjacent to each other along the chain direction. Sprocket teeth can extend into the back side of the chain at a distance that is only half the length of the link by alternately extending between links of laterally adjacent rows of teeth. The sprocket teeth, however, must be in staggered rows across the lateral direction of the chain. FIG. 3 shows a back drive sprocket with rows of teeth that are staggered, i.e. the teeth rows are not laterally aligned. In this arrangement, sprocket teeth only extend into the back side of the chain between links. However, the distance along the chain direction at which the chain successively engages the back drive sprocket is about half the length of a chain link. Consequently, the back-driven sprocket engages chain at three locations along the chain direction for each row of links.

Staggering the rows of teeth on the sprocket, however, requires an expensive manufacturing process. Because back-driven sprockets typically are not required to transmit high loads, moreover, the additional expense of the staggered row is not required to assure adequate power transmission. Therefore, it is desirable to remove the staggered rows of teeth and replace them with a more cost-effective way of limiting chordal fall motion.

U.S. Pat. No. 1,956,942 discloses a chain that drives a sprocket from both front and back sides, and that engages sprockets on both sides of the chain only between chain links. Links of the chain extend into the sprocket to rest against the flanks of adjacent sprocket teeth facing the link. In one embodiment, a center guide is provided to extend into a recess in the sprocket teeth to prevent the chain from moving laterally on the sprocket. The disclosed chain and sprocket do not provide for guiding the chain around the sprocket other than by engaging the teeth of the sprocket and do not otherwise provide any limitation on the increased chordal fall that results from engaging a sprocket having teeth spaced apart the length of a link.

U.S. Pat. No. 5,967,926 discloses a chain that engages sprockets on both the front side and the back side of the chain and that provides flat surfaces on the back side of the chain to contact a shoe of a tensioner. To avoid the problems that arise from engaging a sprocket only at the ends of the links and still present a back side surface that will smoothly contact a tensioner, two shallow teeth are formed on the back side of the chain links with a flat surface joining the teeth shallow. The sprocket that engages the back side of the chain engages each link at its ends and between the shallow teeth. The sprocket teeth have an arcuate top surface that contacts the flat link surface between the shallow teeth. A guide plate positioned adjacent to these links at the lateral edges of the chain positions a flat surface beyond the teeth to provide smooth contact of the back of the back side of the chain against a tensioner shoe.

Thus, a need remains for a method and apparatus for limiting chordal fall motion of a chain on sprockets having wide tooth spacing such as back-driven sprockets.

BRIEF SUMMARY OF THE INVENTION

In accordance with the present invention, disadvantages of chordal fall motion of chains engaging prior sprockets having wide tooth spacing have been overcome. A sprocket according to the present invention having teeth positioned to engage a sprocket only at positions along the chain that are separated by the length of a link of the chain limits chordal fall motion of the chain.

According to the invention, a sprocket having teeth that extend radially outwardly at the periphery of the sprocket supports a chain engaging the sprocket at a desired radial location along the sprocket teeth. The sprocket teeth are separated from adjacent teeth by a distance that is approximately the length of the links of the chain. The chain engages the sprocket by accepting sprocket teeth between alternating links of the chain. The alternate chain links are positioned for driving contact at opposed faces of a sprocket tooth along the chain direction. A link that is laterally adjacent to a sprocket tooth pivotally engages the two driven links at the opposed sprocket tooth faces. The sprocket and joining link are configured to support the joining link at a desired location radially along the sprocket tooth. By supporting the chain in the radial direction at each sprocket tooth, the sprocket limits motion due to chordal fall in the direction radially along the sprocket teeth.

A preferred embodiment of the invention includes a sprocket having two rows of teeth that are separated from adjacent teeth of the row a distance that is approximately the length of the links of a chain. The rows of teeth are aligned in the lateral direction of the chain. A chain engages the sprocket by positioning driven chain links between adjacent teeth in a sprocket teeth row. Links that are pivotally joined to the driven links are positioned laterally adjacent to the sprocket teeth between sprocket teeth rows. The sprocket further includes an inner guiding shoulder between the rows of sprocket teeth that contacts joining links between sprocket teeth. The shoulder supports the joining link at a desired location along the radial direction of the sprocket teeth and thereby supports driven links that are pivotally joined to the joining link and are driven by the sprocket teeth. The sprocket according to the present invention limits chordal fall motion of the chain on the sprocket by supporting the chain in a radial direction along the sprocket teeth.

A chain and sprocket according to the present invention are particularly well adapted for use in a back-driven application. The objects and advantages of the present invention, as well as details of preferred embodiments thereof, will be more fully understood from the drawings and the following description.

BRIEF DESCRIPTION OF THE DRAWINGS

FIG. 5 is a side view of an inverted tooth link and a guide link of the chain shown by FIG. 4.

FIG. 6 is a side view of a section of the chain is shown by FIG. 4 in front side engagement with a sprocket.

FIG. 7 is a side view of a section of the chain and sprocket shown by FIG. 4.

DETAILED DESCRIPTION OF THE INVENTION

Figure 1A:
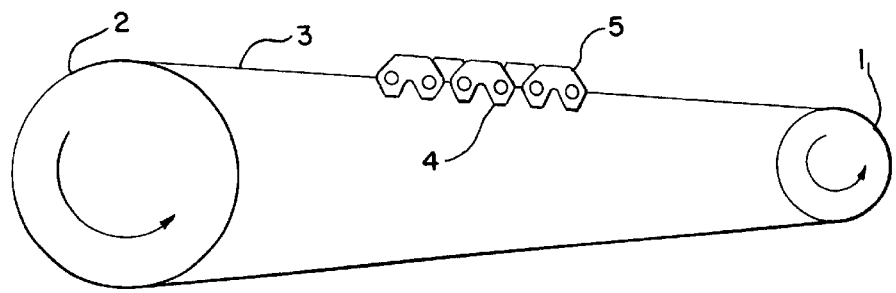
FIG. 1 is a side view of a power transmission chain engaging a sprocket for front-drive and a power transmission chain engaging a sprocket for back-drive.
Figure 1B:
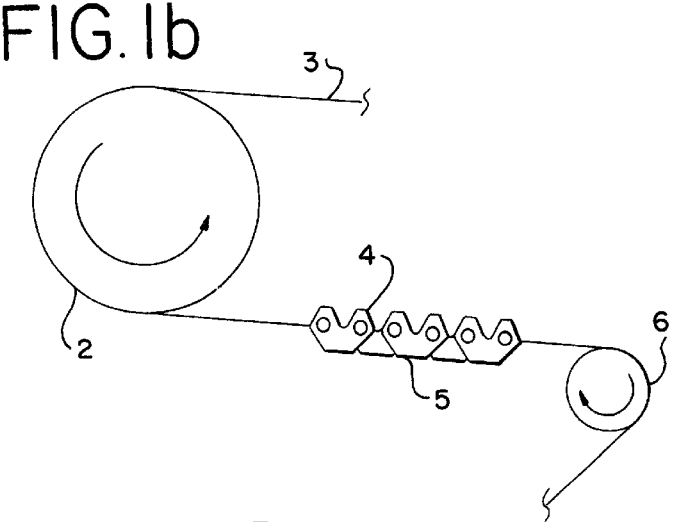
Figure 2:
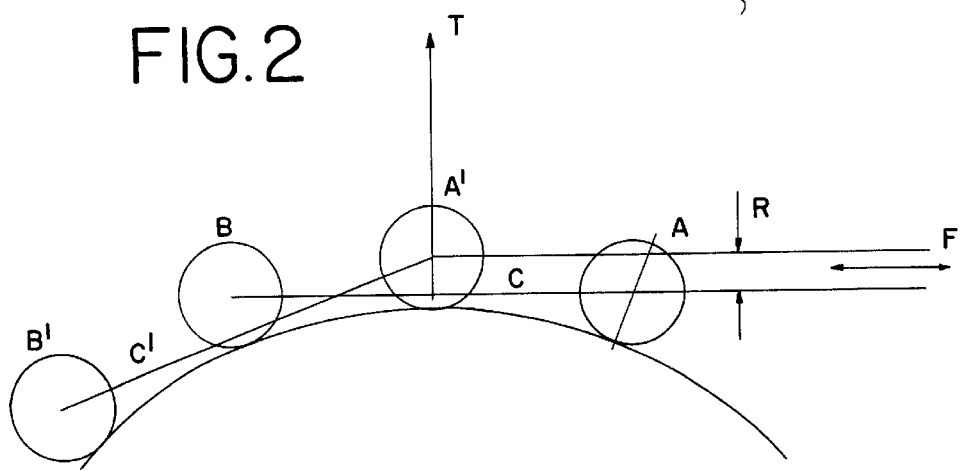
FIG. 2 is a side view illustration of chordal fall of a power transmission chain engaging a sprocket.
Figure 4:
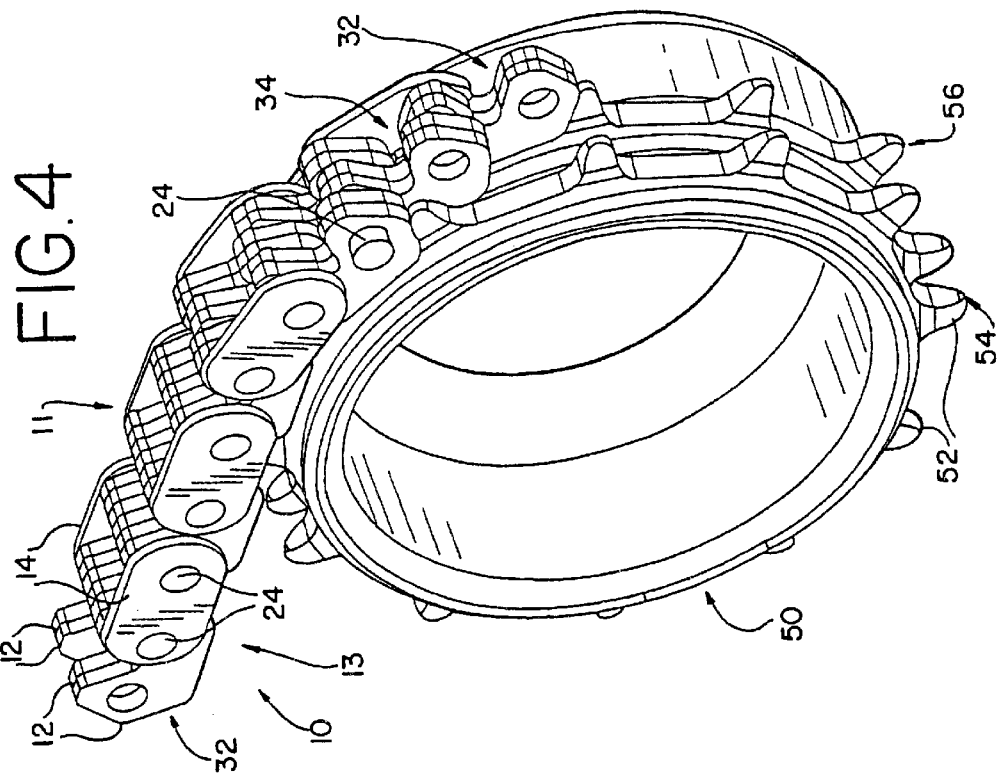
FIG. 4 is an oblique view of a section of a silent chain and a sprocket in back-drive engagement according to the present invention.
Figure 3:
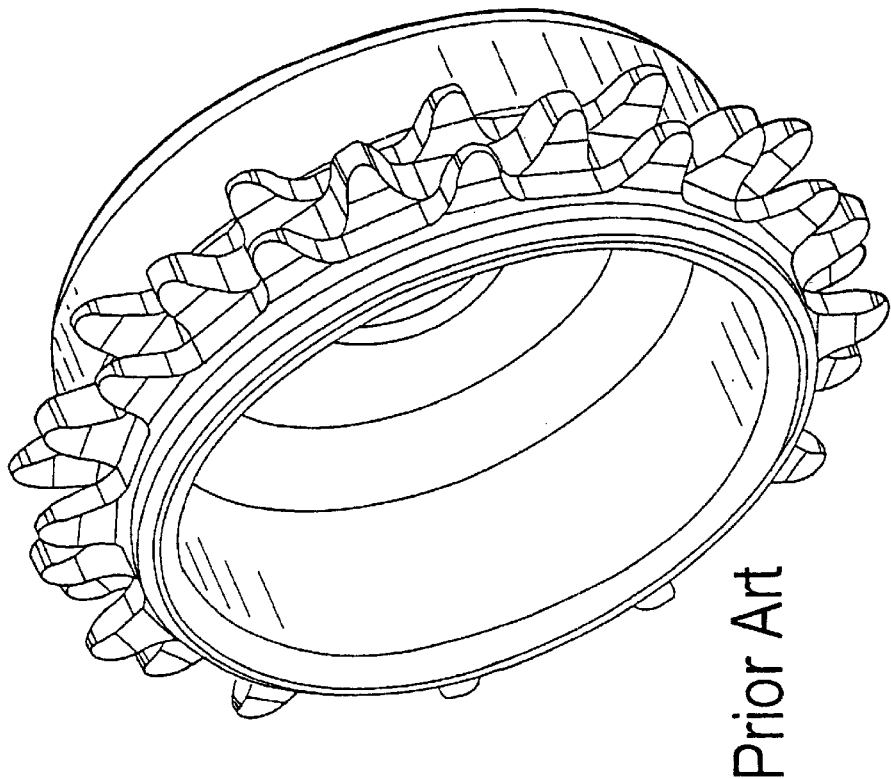
FIG. 3 is an oblique view of a prior art sprocket having multiple rows of staggered teeth.

FIG. 4 shows a sprocket 50 engaging a silent chain 10 according to the present invention. The chain 10 has a front side 11 and a back side 13. The sprocket 50 has teeth 52 spaced around the circumference of the sprocket 50 in two separated and parallel rows 54 and 56. The teeth 52 extend radially outwardly from the sprocket 50. The teeth 52 of the row 54 are each adjacent to a tooth 52 of the row 56. The teeth 52 of the sprocket 50 engage the chain 10 at its back side 13.

The chain 10 is comprised of rows of flat tooth links 12 and guide links 14. As best shown by FIG. 5, the flat tooth links 12 of the chain 10 are generally flat plates that define apertures 18 that are separated is along a chain direction of the link 12. As is conventional for links of a silent chain, the apertures 18 are near the ends of the tooth link 12 along the chain direction. As is also conventional for links of silent chains, the tooth links 12 define two teeth 16 that are adjacent to each along the chain direction and that extend in a front direction that is generally perpendicular to the chain direction. The guide links 14 are flat plates that define two apertures 22 that are separated from each other along the chain direction of the guide link 14.

The chain 10 is formed by flat tooth links 12 arranged in alternating outer rows 32 and inner rows 34. The inner rows 34 are formed by two tooth links 12 that are positioned adjacent to each other so that flat plate surfaces of the links 12 are adjacent to each other. The two links 12 forming the inner row 34 are positioned so that the apertures 18 of the adjacent tooth links 12 are aligned to define openings though the inner row 34. The outer rows 32 are formed by two pairs of side by side tooth links 12. As for the inner rows 34, each of the pairs of links 12 that define an outer row 32 are positioned side by side so that the apertures 18 are aligned to define openings though the outer row 34. The two pairs of links 12 are separated by the thickness of the inner rows 34 to accept a portion of an adjacent inner row 34 between the pairs of flat links 12 that form the outer row 32. Adjacent inner and outer rows are interleaved so that a portion of each inner row 34 adjacent to the ends of an outer row 32 is positioned between a portion of the pairs of flat links 12 that form the outer row 32 that is adjacent to the inner row 34. The apertures 18 of the inner row 34 are aligned with the apertures 18 of the two pairs of teeth 12 that form the outer row 32 to define an opening through the overlapping portions of the inner row 34 and the outer row 32.

Two guide plates 14 are positioned laterally adjacent the inner rows 34, one at each side of the inner row and separated from the inner row 34 by the width of the pair of links 12 of the adjacent outer rows 32 that overlap each end of the inner row 34. The apertures 22 of the guide plates 14 are aligned with the apertures 18 of the inner row 34 and the overlapping portions of the outer rows 32. A pin 24 extends through aligned apertures 22 of the guide plates 14 on either lateral side of the inner row 34 and apertures 18 of the tooth links 12 of the inner row 34 and the apertures 18 of the two pairs of tooth links 12 of the overlapping outer row 32. The pin 24 may be secured near its ends to the guide plates 14. The apertures 18 of the tooth links 12 of the inner and outer rows 34 and 32 may be sized so that the tooth links 12 articulate about the pin 24. The chain 10 forms an endless loop of outer rows 32 and inner rows 34 joined by pins 24 that extend through guide plates 14. The chain 10 is an endless loop that is formed so that the teeth 16 of the links 12 extend toward the region within the loop. The surface of the chain 10 along which the teeth 16 extend is the front side 11 of the chain 10. The surface of the chain 10 that is opposite the front side of the chain and faces outwardly from the region within the endless loop is the back side 13 of the chain 10.

As shown by FIG. 6, the teeth 16 along the front side 11 of the chain 10 will mesh with a sprocket 40 within the regions bounded by the endless loop formed by chain 10 in a manner that is conventional for front drive silent chain and sprocket engagement. As the chain 10 wraps about the sprocket 40, the front-driven sprocket 40 positions a tooth 41 between the teeth 16 of every link 12 in the inner rows 34 and the outer rows 32. Thus, every link 12 engages a tooth of the sprocket 40 at each end along its chain direction and between teeth 16. The engagement of the sprocket 40 and front side 11 of the chain 10 is referred to as single tooth spacing.

FIG. 7 shows the back side 13 of the silent chain 10 engaging the teeth 52 of the sprocket 50. The teeth 52 of rows 54 and 56 are separated from adjacent teeth in the row the length of the tooth links 12 along a chain direction of the chain 10. As shown by FIGS. 4 and 7, the sprocket-50 does not engage the back side 13 of the chain 10 at single tooth spacing. As shown by FIG. 5, the tooth links 12 define a back side that faces opposite from the teeth 16 along the back side 13 of the chain 10. The back side of the links 12 includes a guide surface 42 that is generally flat and extends along the chain direction of the link, and two back side flanks 44 that extend from opposite ends of the guide surface 42 toward the front side of the tooth 12 and face partially along the chain direction of the link 12.

The two rows 54 and 56 of sprocket teeth 52 of the sprocket 50 are separated from each other to accept the inner rows 34 between those rows, and to engage the separated pairs of links 12 of the outer rows 32. As best shown by FIG. 7, the sprocket teeth 52 are configured and separated from adjacent teeth around the periphery of the sprocket 50 to accept a tooth link 12 between adjacent teeth. Faces 62 on either side of the sprocket tooth 52 are adjacent to the side flanks 44 of the links 12 of the outer row 32 adjacent to the sprocket tooth 52. As the chain 10 engages the sprocket 50, the sprocket 50 positions two teeth 52, one from each of the rows 54 and 56, between adjacent outer rows 32, one tooth 52 adjacent to each pair of teeth 12 that comprise an outer row 32. Thus, the chain 10 engages the teeth 52 of the sprocket 50 at a distance around the periphery of the sprocket 52 that is twice the distance that it engages teeth of a front drive sprocket 40. The engagement of the sprocket 50 and the back side 13 of the chain 10 is referred to as double tooth spacing.

Figure 8:
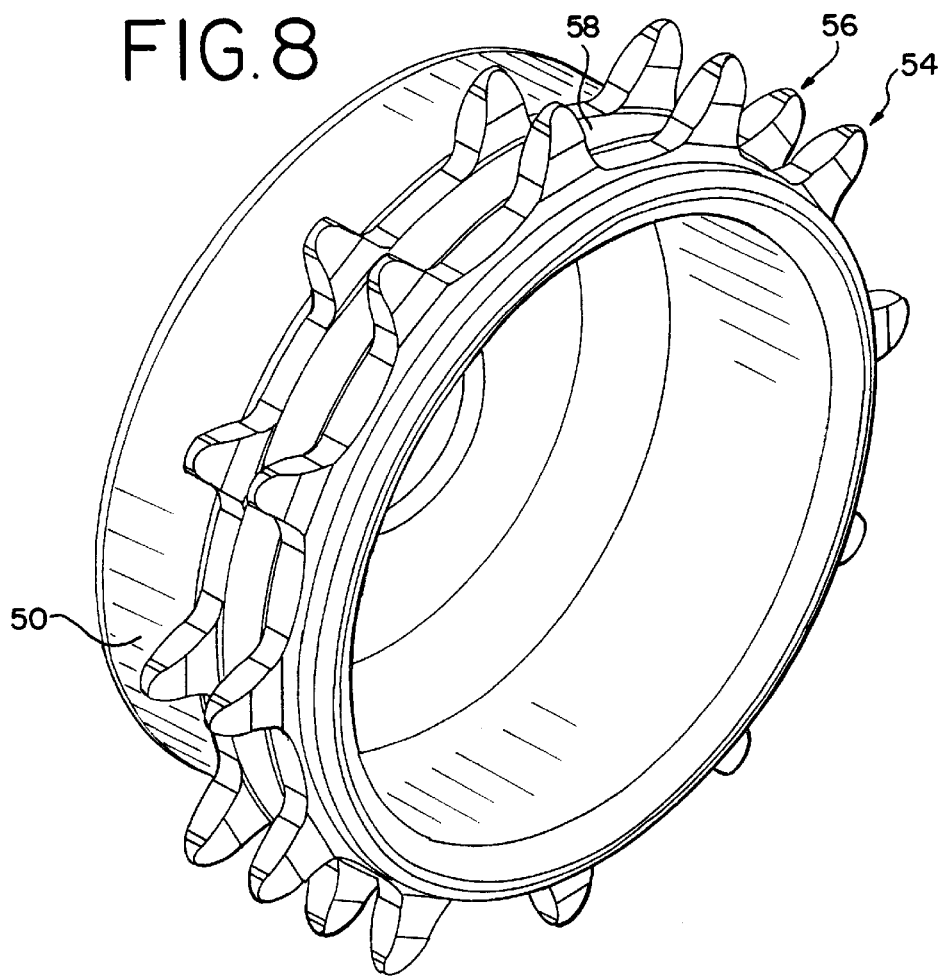
FIG. 8 is an oblique view of the sprocket shown by FIG. 4.

A sprocket engaging a chain by double tooth spacing conventionally does not limit motion due to chordal fall as does a sprocket engaging a chain with single tooth spacing. In accordance with the present invention, the sprocket 50 and chain 10 are configured so that the sprocket 50 engages the chain 10 to limit the motion of the chain 10 along the sprocket teeth 52. As shown by FIGS. 4, 7, and 8, the sprocket 50 includes a raised shoulder 58 positioned between the rows 54 and 56 of sprocket teeth 52. As shown by FIGS. 4 and 7, the shoulder 58 contacts the guide surface 42 of the links 12 of the inner rows 34 positioned between the sprocket teeth 52. The shoulder 58 supports the inner rows 34 at the appropriate location along the radial, inward to outward, direction along the sprocket teeth 52. Because the inner rows 34 are supported at the appropriate location, the outer rows 32 are supported by the inner rows 34 at each end along the chain direction, and are maintained in the appropriate position between the adjacent sprocket teeth 52 of the rows 54 and 56.

As best shown by FIG. 7, the sprocket teeth 52 each define two faces 62 on opposed sides of tooth 52 facing along the periphery of the sprocket 50 that is wrapped by the chain 10. The faces 62 are adjacent to the back side flanks 44 of the links 12 of the outer rows 32. The faces 62 of adjacent teeth 52 are joined by a crotch 64. The crotch 64 extends into the sprocket 50 to provide a clearance between the guide surface 42 of the link 12 adjacent to the crotch 64. The links 12 of the outer rows 32 contact the sprocket only at the faces 62 of the teeth 52. The links 12 of the outer rows 32 are maintained at desired location radially outwardly from the sprocket 52 and in a desired position with respect to the teeth 52 by the pins 24 that join the outer rows 32 to the adjacent inner rows 34 which are supported by the shoulder 58.

Figure 9:
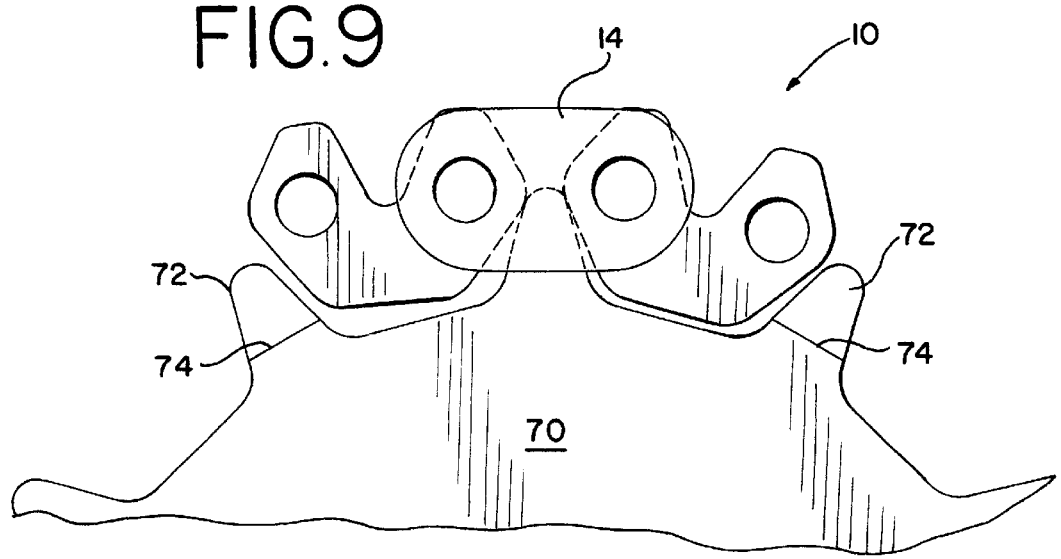
FIG. 9 is a side view of a section of a chain engaging a sprocket according to another embodiment of the present invention.

FIG. 9 shows a sprocket 70 that supports the inner rows 34 of the chain 10 by an alternative structure to the shoulder 58. The sprocket 70 has teeth 72 that engage the chain 10 from the back side 13 as do the teeth 52 of the sprocket 50. The sprocket 70 does not have a shoulder between rows of teeth. Rather, the teeth 72 forms a ledge 74 at the laterally outside surface of the tooth 72. The guide plates 14 at the lateral extents of the inner rows 34 extend adjacent to the lateral sides of the teeth 72, and abut the ledge 74 that extends outwardly from the lateral surface of the teeth 72. The ledge 74 supports the guide links 14 at a desired location adjacent to the teeth 72 to support the guide link 14 and the inner row 34 of which it forms a part at a desired location along the radial direction of the tooth 72.

While most of the previous discussion has taken place in the context of back-driven arrangements, the above principles apply to any double tooth spaced sprockets. Further, while the invention has been described in connection with preferred embodiments, it will be understood that those embodiments are not the limit of the invention. Rather, the invention covers all alternatives, modifications, and equivalents within the spirit and scope of the invention as defined by the appended claims.

What is claimed is:

1. A sprocket and power transmission chain for limiting chordal fall motion comprising:
   a sprocket having sprocket teeth extending radially outwardly at an outer surface of the sprocket,
   a power transmission chain having two series of links, each link of a series positioned adjacent to two links of the series at opposite ends of the link along a chain direction, the first and second series of said two series positioned laterally adjacent to each other and each link of the second series positioned laterally adjacent to, pivotally connected to, and extending between adjacent ends of two links of the first series, the sprocket teeth separated from adjacent sprocket teeth to accept a link of the first series of links of the power transmission chain between adjacent sprocket teeth, and sized to extend into the chain between adjacent links of the first series and laterally adjacent to the link of the second series pivotally connected to the links of the first series adjacent to the sprocket tooth, the sprocket defining a surface adjacent to each sprocket tooth that abuts the link of the second series that is adjacent to the sprocket tooth to support the link at a desired location radially along the sprocket tooth, the sprocket having teeth formed in two parallel rows, each tooth of a first row laterally aligned with a tooth of a second row, the teeth in each row separated from adjacent teeth in the row to accept a link of the chain between the sprocket teeth, the chain having inner links and outer rows of links, the outer rows of links including two links side by side in a lateral direction and separated so that one link can be placed in each row of sprocket teeth, the chain including an inner link between and interleaved with adjacent outer rows of links, the inner links being pivotally connected to the outer rows and positioned between the two links of the adjacent outer rows of links, the inner links being sized to be positioned between laterally adjacent sprocket teeth of the two rows of sprocket teeth, the surface that abuts the link abutting the inner link between laterally adjacent teeth of the sprocket teeth rows.

2. The sprocket and power transmission chain of claim 1, wherein the surface between laterally adjacent sprocket teeth is defined by a shoulder extending around the sprocket between the rows of sprocket teeth.

3. A power transmission chain and a sprocket engaging the chain by double tooth spacing and limiting chordal fall motion of the chain comprising:

a power transmission chain extending along a chain direction to form an endless loop, the power transmission chain having a front side adjacent a region within the endless loop, a back side opposite the front side, a first series of links and a second series of links aligned along the chain direction, each link extending a link length along the chain direction from a first end to a second end and separated from an adjacent link of the series at the first and second ends, the first series and the second series of links extending along the chain direction and having a front side at the front side of the chain and a back side at the back side of the chain, adjacent to each other along a side direction that is perpendicular to the chain direction and perpendicular to a front to back direction, and offset from each other along the chain direction so that each link of the first series extends along the chain direction adjacent to and between two links of the second series that are adjacent to each other in the chain direction and each link of the second series extends along the chain direction adjacent to and between two links of the first series that are adjacent to each other in the chain direction, each link of each series is pivotally connected to links adjacent to the first end and to the second end of the link in the lateral direction of the chain near the first end and the second end of the link, forms two teeth at the front side of the chain that are adjacent to each other along the chain direction, forms two flanks at the back side of the chain facing outwardly from the link, a first flank near the first end of the link, and a second flank near the second end of the link, and forms a back side surface between the flanks and extending along the chain direction, and a sprocket having a series of double-spaced sprocket teeth extending radially outwardly at an outer surface of the sprocket to engage the back side of the chain, the sprocket teeth separated from adjacent sprocket teeth to accept a link of the first series of links of the power transmission chain between adjacent sprocket teeth, sized to extend into the chain between aligned adjacent links of the first series of links of the chain adjacent to flanks of aligned links, and adjacent to a link of the second series of links that is pivotally connected to the adjacent links of the first series of links, and the sprocket defining a surface adjacent to each sprocket tooth to abut the back side of the link of the second series that is adjacent to the sprocket tooth to support the power transmission chain at a desired location radially along the sprocket tooth.

4. The power transmission chain and sprocket of claim 3, wherein the surface formed by the sprocket adjacent to each tooth is a shoulder that extends along the outer surface of the sprocket adjacent to the sprocket teeth.

5. The power transmission chain and sprocket of claim 3, wherein the chain further comprises a third series of links extending along the chain direction and having a front side at the front side of the chain and a back side at the back side of the chain, the third series of links adjacent to the second series of links in the lateral direction of the chain and opposite the first series of links, each link of the third series of links adjacent to and separated from a link of the first series of links, adjacent links of the first series of links and third series of links pivotally connected near their first ends to a first link of the second series of links, and connected near their second ends to a second link of the second series of links, and the sprocket further comprises a second series of double-spaced sprocket teeth extending radially outwardly at an outer surface of the sprocket to engage the back side of the chain, the second series of teeth adjacent to and separated from the series of sprocket teeth, the sprocket teeth of the second series separated from adjacent sprocket teeth of the second series to accept a link of the third series of links between adjacent sprocket teeth, and sized to extend into the chain between aligned adjacent links of the third series of links of the power transmission chain and adjacent to a link of the second series of links that is pivotally connected to the adjacent links between which the sprocket tooth extends.

6. The power transmission chain and sprocket of claim 5, wherein the surface formed by the sprocket adjacent to each tooth is a shoulder that extends along the outer surface of the sprocket adjacent to and between the series of sprocket teeth and the second series of sprocket teeth.

* * * * *